(12) United States Patent
Dietachmayr

(10) Patent No.: US 9,434,112 B2
(45) Date of Patent: Sep. 6, 2016

(54) APPARATUS FOR LAYING FIBER TAPES

(71) Applicant: GFM—GmbH, Steyr (AT)

(72) Inventor: Harald Dietachmayr, Sierning (AT)

(73) Assignee: GFM—GmbH, Steyr (AT)

( * ) Notice: Subject to any disclaimer, the term of this patent is extended or adjusted under 35 U.S.C. 154(b) by 55 days.

(21) Appl. No.: 14/538,886

(22) Filed: Nov. 12, 2014

(65) Prior Publication Data

US 2015/0165698 A1    Jun. 18, 2015

(30) Foreign Application Priority Data

Dec. 16, 2013   (AT) .............................. A 50832/2013

(51) Int. Cl.
*B29C 70/38* (2006.01)
*B29L 9/00* (2006.01)

(52) U.S. Cl.
CPC .......... *B29C 70/388* (2013.01); *B29L 2009/00* (2013.01); *Y10T 156/17* (2015.01)

(58) Field of Classification Search
CPC .... B29C 70/384; B29C 40/38; B29C 70/388
See application file for complete search history.

(56) References Cited

U.S. PATENT DOCUMENTS

| | | | | |
|---|---|---|---|---|
| 4,351,688 A | | 9/1982 | Weiss et al. | |
| 4,750,965 A | * | 6/1988 | Pippel | B29C 70/388 156/361 |
| 4,869,774 A | * | 9/1989 | Wisbey | B29C 70/32 156/486 |
| 5,015,326 A | * | 5/1991 | Frank | B29C 70/388 156/353 |
| 5,058,497 A | * | 10/1991 | Bishop | B29C 63/0004 100/155 R |
| 5,314,563 A | * | 5/1994 | Grimshaw | B29C 70/388 156/358 |
| 5,352,306 A | | 10/1994 | Grimshaw et al. | |
| 5,454,897 A | * | 10/1995 | Vaniglia | B29C 70/32 156/166 |
| 5,975,179 A | * | 11/1999 | Kelly, Jr. | F16C 13/003 156/412 |
| 6,105,648 A | * | 8/2000 | De Graaf | B29D 30/28 156/412 |
| 6,390,169 B1 | * | 5/2002 | Johnson | B29C 70/384 156/523 |
| 9,248,591 B2 | * | 2/2016 | Caffiau | B29C 43/22 |
| 2007/0044922 A1 | * | 3/2007 | Mischler | B29C 70/382 156/574 |
| 2008/0000576 A1 | * | 1/2008 | Miller | B29C 70/382 156/166 |
| 2013/0092325 A1 | * | 4/2013 | Genssen | B29C 70/388 156/580 |

FOREIGN PATENT DOCUMENTS

DE    27 53 272 A1    5/1979
EP    0 371 289 A1    6/1990

* cited by examiner

*Primary Examiner* — Jeff Aftergut
(74) *Attorney, Agent, or Firm* — Collard & Roe, P.C.

(57) ABSTRACT

An apparatus for laying fiber tapes includes a deflection guide for the fiber tapes made up of pressure plates for the deflection of the tapes, which pressure plates are arranged adjacent to one another perpendicularly to the deflection axis and are resiliently supported in the pressing direction, and a frame, which is displaceable in the laying direction, for accommodating the pressure plates. The pressure rollers form grooved pulleys which engage in circumferential bearing receivers, are axially guided on each other and between lateral guide stops, and are held in bearing engagement with the bearing receivers by elastic endless belts which are guided about a bearing roller mounted in lateral retainers. The bearing receivers are resiliently supported independently from each other in the pressing direction on an abutment provided between the lateral retainers.

6 Claims, 4 Drawing Sheets

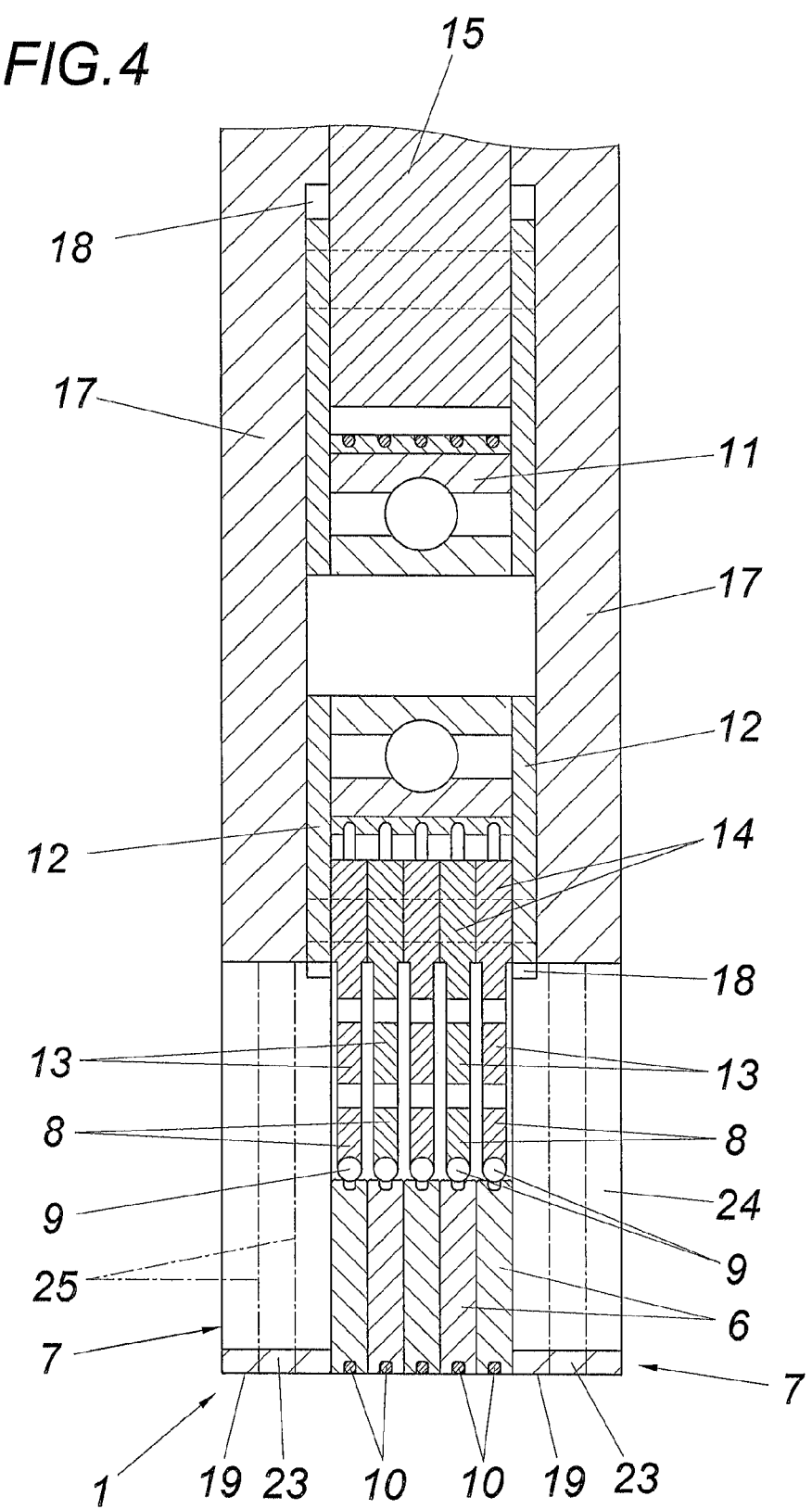

APPARATUS FOR LAYING FIBER TAPES

CROSS REFERENCE TO RELATED APPLICATIONS

Applicant claims priority under 35 U.S.C. §119 of Austrian Application No. A50832/2013 filed Dec. 16, 2013, the disclosure of which is incorporated by reference.

FIELD OF THE INVENTION

The invention relates to an apparatus for laying fiber tapes, comprising a deflection guide for the fiber tapes consisting of pressure plates for the deflection of the tape, which pressure plates are arranged adjacent to one another perpendicularly to the deflection axis and are resiliently supported in the pressing direction, and comprising a frame, which is displaceable in the laying direction, for accommodating the pressure plates.

DESCRIPTION OF THE PRIOR ART

Laying heads with a deflection guide for the fiber tapes are usually used for producing fiber structures, which laying heads are pressed against the already laid fiber layers by means of the adjacently arranged pressure plates which form the deflection guide. The fiber tapes, which comprise an adhesive tape carrying a fiber layer, are drawn off a supply roll to the extent of the forward feed movement of the laying head and supplied to the deflection guide in order to press the fiber layer to the already laid fiber layers on the one hand and to draw off the adhesive tape from the fiber layer on the other hand, which requires a comparatively small deflection radius. Since the individual fiber layers of the fiber structure are to be placed tightly on each other with no trapped air in between, a respective pressurization of the fiber tapes by the deflection guide must be ensured. It is known for this purpose (EP 0 371 289 B1) to mount the pressure plates arranged in an assembly next to one another in a displaceable manner independently of each other in the pressing direction in a frame and to apply pressure to the same by a membrane, so that the individual pressure plates are also able to follow an uneven progression of the already laid fiber layers as a result the flexibility of the membrane.

In order to reduce the friction produced during pressing of the fiber tapes against the already laid fiber layers between the pressure plates and the adhesive tape of the fiber tapes, it is further known (U.S. Pat. No. 4,351,688 A, US 2007/044 922 A1) to replace the pressure plates by pressure rings which are rotatably mounted on the bearing discs that are displaceably guided in the pressing direction. Irrespective of whether the pressure rings mounted on the resiliently supported bearing discs are respectively pressurized via pressure rollers (U.S. Pat. No. 4,351,688 A) or whether the bearing discs are supported on pressure cylinders (US 2007/044922 A1), these pressure rings come with the disadvantage that the displaceable bearing of their pressure discs requires comparatively large diameters of the pressure rings, which has a disadvantageous effect not only on the pressing pressure that is exerted on the fiber tape, but also on the removal of the adhesive tape from the fiber layer of the fiber tapes.

SUMMARY OF THE INVENTION

The invention is thus based on the object of providing a deflection guide for the fiber tapes in an apparatus for laying fiber tapes, which deflection guide, under advantageous frictional conditions, allows good pressing of the fiber tapes against the already laid fiber layers on the one hand and secure removal of the adhesive tape from the fiber layer on the other hand, without giving rise to the likelihood that the fiber layer is partly lifted from the fiber structure again during the removal of the adhesive tape.

On the basis of an apparatus of the kind mentioned above, this object is achieved in accordance with the invention in such a way that the pressure rollers form grooved pulleys which engage in circumferential bearing receivers, are axially guided on each other and between lateral guide stops and are held in bearing engagement with the bearing receivers by means of elastic endless belts which are guided about a bearing roller mounted in lateral retainers, and that the bearing receivers are resiliently supported independently from each other in the pressing direction on an abutment provided between the lateral retainers.

By providing grooved pulleys which are held by means of elastic endless belts in bearing receivers, which belts guide said grooved pulleys over a circumferential section, a bearing of the grooved pulleys on a shaft can be avoided, so that no bearings for such shafts are required. This provides constructional prerequisites so as to enable selecting the diameter irrespective of a shaft accommodating the groove pulleys. The possibility of resilient support in the pressing direction is still maintained because the bearing receivers themselves are resiliently supported independently from each other in the pressing direction on an abutment which is provided between the lateral retainers. In addition to the radial guidance of the grooved pulleys via the bearing receivers, it is further necessary to ensure a respective axial guidance. For this reason, the grooved pulleys which are laterally guided on each other are accommodated between lateral guide stops which fix the axial position of the groove pulleys without preventing their radial displacement. The elastic endless belts, with which the grooved pulleys are individually held in bearing engagement with the bearing receivers, must be provided with sufficient expansion behavior in order to ensure the displacement of the groove pulleys within the scope of the pretensioning of the resilient support of the bearing receivers. The apparatus in accordance with the invention thus comprises a deflection guide for the fiber tapes which utilizes the advantages of pressure rollers without having to take into account their disadvantages.

Especially advantageous guiding conditions are obtained for the grooved pulleys when the bearing receivers comprise rolling bodies engaging in the grooved pulleys, because in this case an axial guide component can be applied to the grooved pulleys via the rolling bodies.

The lateral guide stops for the grooved pulleys can also be used for pressing the fiber tape against the already laid fiber layers when the grooved pulleys are combined into individual pressure elements between the pressure plates, which comprise a sliding surface for tape deflection which is curved according to the belt pulleys and which form the lateral guide stops, wherein the retainers arranged laterally on the pressure elements displaceably engage in the pressing direction in recesses of the pressure plates. These recesses in the pressure plates are required in order to enable the connection of the pressure plates in a directly axial manner to the pressure elements formed by the individual grooved pulleys on the one hand and to ensure on the other hand a mutual displacement of the pressure plates and the pressure elements in the pressing direction. In order to optimally press thicker fiber tapes in particular onto the already laid fiber structure, the pressure elements and the pressure plates can be displaceably mounted in a frame in the pressing direction in order to pressurize the pressure elements and the pressure plates independently from each other via a common membrane with a pressure medium.

If the pressure plates form sliding shoes which are resilient in the pressing direction and are separated by recesses from the remaining plate body, individual pressurization of the individual pressure elements and pressure plates can be omitted because the sliding shoes, as a result of the resilient pretensioning which is comparable to the resilient pretensioning of the groove pulleys, are already able to follow the surface progression of the already laid fiber layers within the scope of the spring-elastic pretensioning without having to displace the pressure plate itself.

In order to obtain a finely graduated subdivision of the sliding shoes of the pressure plates which is adjusted to the grooved pulleys, the sliding shoes can be subdivided into mutually independent resilient sliding segments which are parallel to the plane of the plates.

BRIEF DESCRIPTION OF THE DRAWINGS

The subject matter of the invention is shown in the drawings by way of example, wherein:

FIG. 4 shows a sectional view along the line V-V of FIG. 3 on an enlarged scale.

DESCRIPTION OF THE PREFERRED EMBODIMENT

Figure 1:
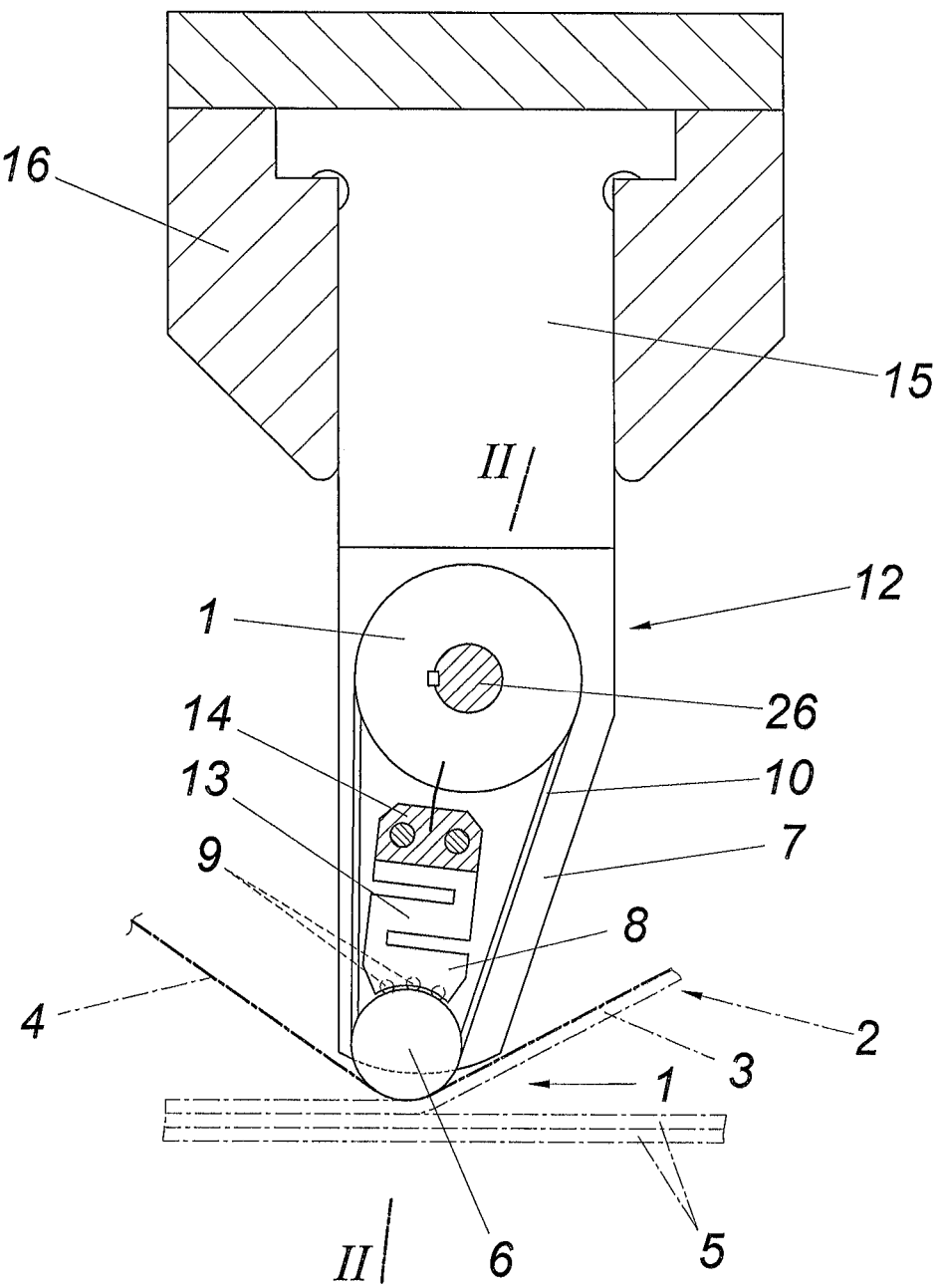
FIG. 1 shows longitudinal sectional view of an apparatus for laying fiber tapes in accordance with the invention in the region of the deflection guide for the fiber tapes.
Figure 2:
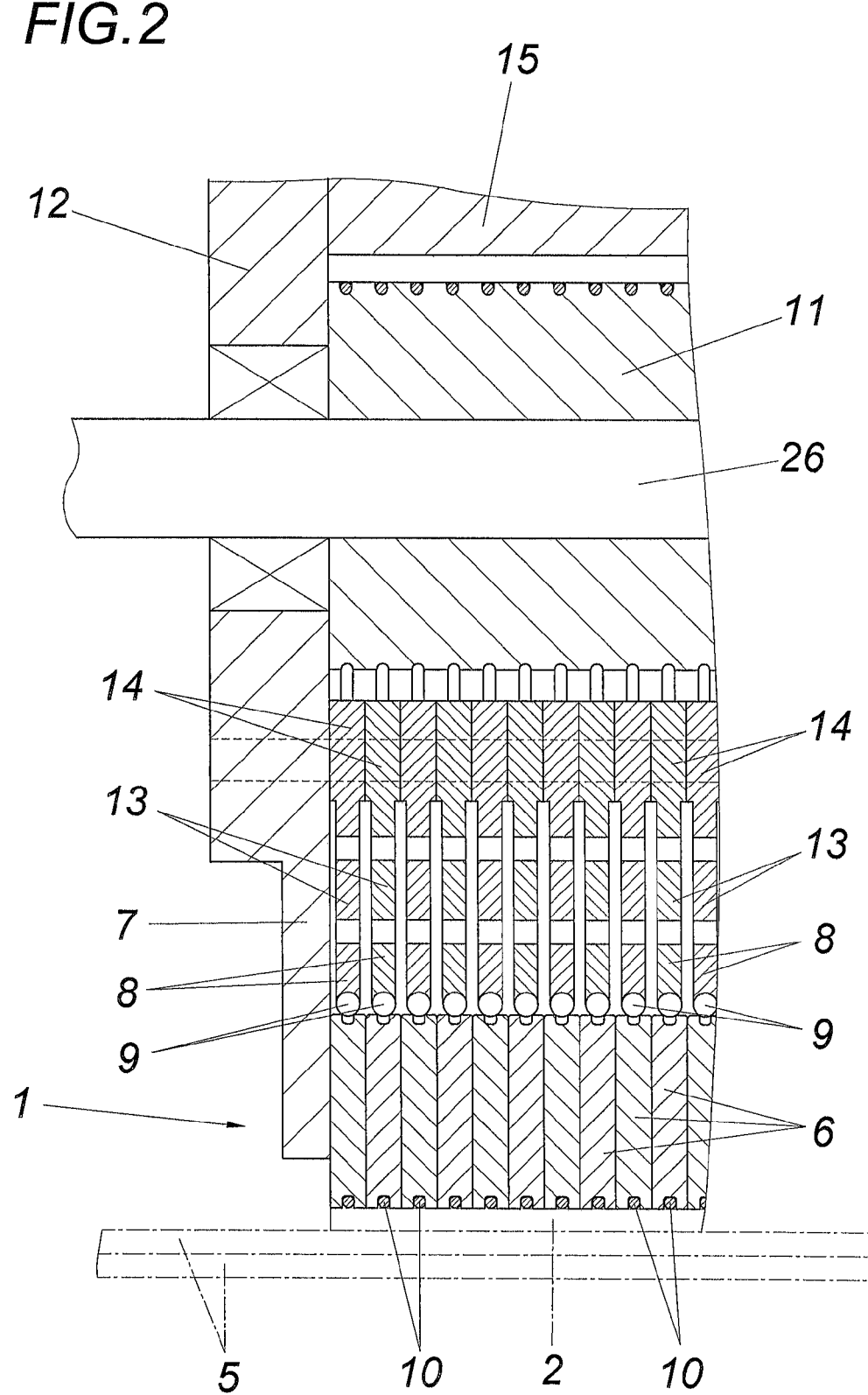
FIG. 2 shows this apparatus in a sectional view along the line II-II of FIG. 1 on an enlarged scale.

In accordance with the embodiment according to FIGS. 1 and 2, the apparatus comprises a laying head with a deflection guide 1 for the fiber tapes 2 which comprise an adhesive tape 4 carrying a fiber layer 3. Said fiber tapes 2 are drawn off a supply roll and pressed by means of the deflection guide 1 against the already laid fiber layers 5 of a fiber structure to be formed, wherein the adhesive tape 4 is drawn off the fiber layer 3 of the fiber tape 2, which occurs at a comparatively small deflection radius. The deflection guide 1 is composed of a plurality of pressure rollers in form of belt pulleys 6 which are arranged next to one another perpendicularly to the deflection axis and which are axially guided between lateral guide stops 7. The grooved pulleys 6 engage in bearing receivers 8, which are provided with rolling bodies 9 which guide the grooved pulleys 6 via their grooves. For radial fixing within the bearing receivers 8, the grooved pulleys 6 are supported via an elastic endless belt 10 against a bearing roller 11, which is mounted in lateral retainers 12 which form the guide stops according to FIGS. 1 and 2, so that the grooved pulleys 6 which are guided axially between the guide stops are held in engagement with the bearing receivers 8 in the radial direction by the elastic endless belt 10 and the bearing roller 11. The bearing receivers 8 themselves are respectively resiliently supported via the spring elements 13 in the pressing direction on an abutment 14, which is arranged between the lateral retainers 12.

Since the lateral retainers 12 are fixed to a pressure element 15 and the pressure element 15 is clamped according to FIG. 1 in a non-displaceable way in a frame 16, the belt pulleys 6 are applied with a respective pressing force under resilient pretensioning of the spring elements 13 to the fiber layers 5 in the case of pressurization of the frame 16, so that the respective fiber tape 2 guided about the grooved pulleys 6 is pressed against the fiber layers before the adhesive tape 4 is drawn off the fiber layer 3 which is pressed against the already laid fiber layers 5. The individual grooved pulleys 6 can therefore be displaced independently from each other in the pressing direction within the scope of the pretensioning of the associated spring elements 13, which allows a finely graduated adjustment of the deflection guide 1 to the surface progression of the already laid fiber structure.

Figure 3:
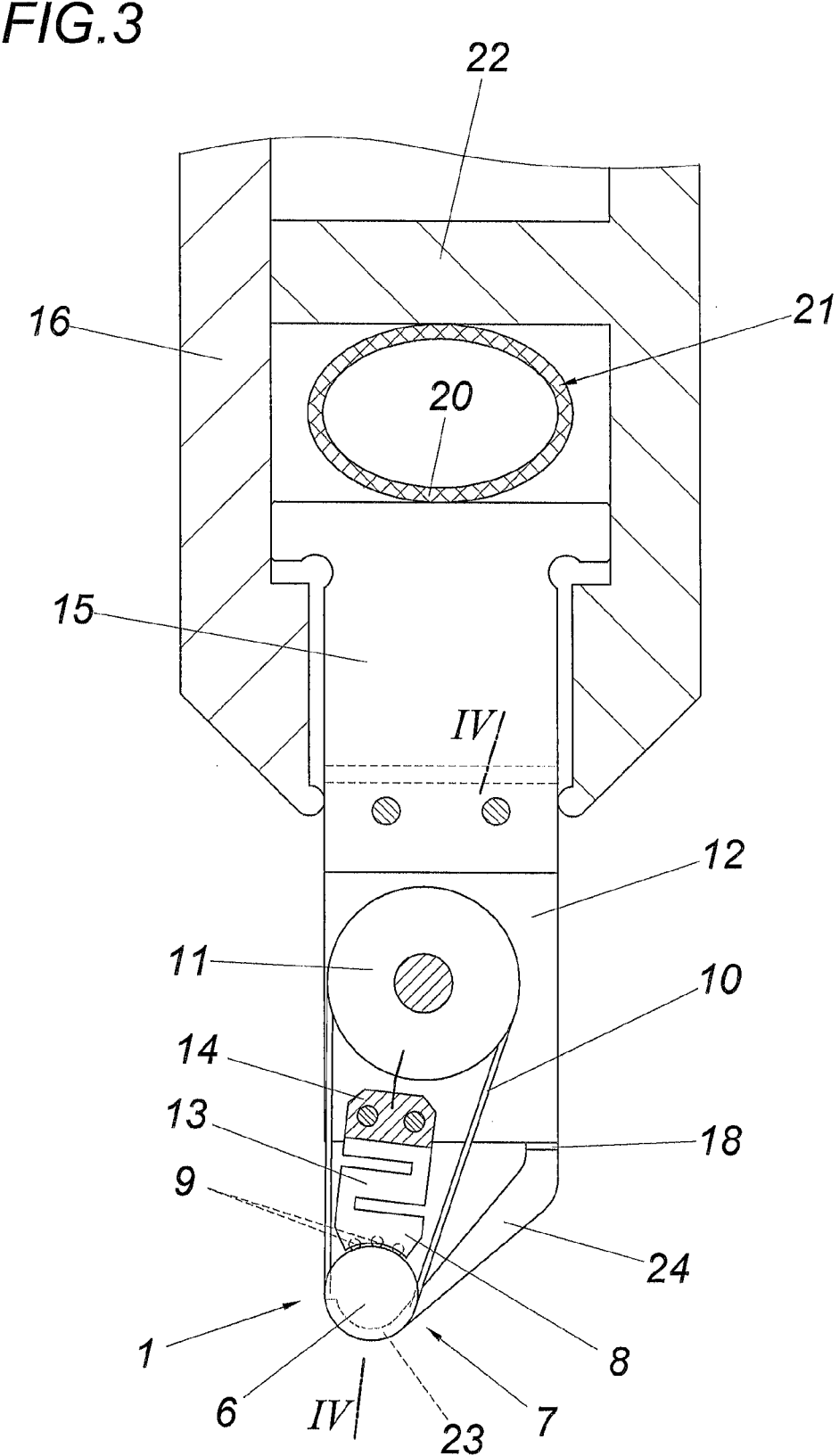
FIG. 3 shows an illustration according to FIG. 1 of a constructional variant of an apparatus in accordance with the invention.

In contrast to FIGS. 1 and 2, the guide stops 7 are not formed by the lateral retainers 12 but by separate pressure plates 17 according to the embodiment according to FIGS. 3 and 4, which pressure plates displaceably accommodate individual pressure elements 15 with grooved pulleys 6 between themselves in the pressing direction according to FIGS. 1 and 2. For this purpose, the pressure plates 17 are provided with recesses 18, in which the lateral retainers 12 engage with a respective play of movement in the pressing direction, so that the lateral retainers 12 cannot impair the axial guidance of the grooved pulleys 6 between the pressure plates 17 as the guide stops 7. As a result of the arrangement of the pressure elements 15 with the grooved pulleys 6 between the pressure plate 17 with sliding surfaces 19 which are adjusted to the belt pulleys 6 for the deflection of the tape, the pressure plates 17 and the pressure elements 15 can be pressurized mutually independently from each other via a common membrane 20 by means of a pressure medium. The pressure plates 17 and the pressure element 15 must be displaceably mounted in the frame 16 in the pressing direction, as is shown in FIG. 3, in which the membrane is arranged in form of a pressure hose 21 which rests on a frame wall 22 on the circumferential side which is opposite of the pressure plate 17 and the pressure elements 15.

Such individual pressurization of the pressure plate 17 is not mandatory however when the pressure plates 17 form a sliding shoe 23 producing the sliding surface 19, which is connected via a resilient web 24 to the remaining plate body and can therefore be pressurized in the pressing direction according to the grooved pulleys 6 with resilient pretensioning. As a result, the sliding shoe 23, which is simultaneously used as a lateral guide stop 7 for the grooved pulleys 6, can also individually follow the surface progression of the already laid fiber layers 5 in the laying direction like the grooved pulleys 6, so that a separate pressurization of the individual pressure plate 17 and pressure elements 15 can be omitted under certain circumstances.

The sliding shoes 23 of the pressure plates 17 can be subdivided into mutually independent, spring-loaded sliding segments by means of slits 5 which are parallel to the plane of the plate, as is indicated in FIG. 4 by the dot-dash line. This allows a finely graduated tracking of the sliding shoes 17 also in the region of the pressure plate 17, which tracking follows the fiber structure surface in the laying direction and which is comparable to the grooved pulleys 6.

The provision of the rotatably mounted grooved pulleys 6 reduces the frictional resistance caused by the deflection of the tape about the deflection guide 1. This frictional resistance can additionally be decreased when the bearing roller 11 is driven via a shaft 26 for the elastic endless belt 10 according to FIG. 1, which produces a respective drive of the grooved pulleys via the endless belt 10.

What is claimed is:

1. An apparatus for laying fiber tapes (2), comprising a deflection guide (1) for the fiber tapes (2) comprising pressure plates for deflection of the tapes, which pressure plates are arranged adjacent to one another perpendicularly to a deflection axis and are resiliently supported in a pressing direction, and comprising a frame (16), which is displaceable in a laying direction, for accommodating the pressure plates, wherein pressure rollers form grooved pulleys (6) which engage in circumferential bearing receivers (8), are axially guided on each other and between lateral guide stops (7) and are held in bearing engagement with the bearing receivers (8) by means of elastic endless belts (10) which are guided about a bearing roller (11) mounted in lateral retainers (12), and wherein the bearing receivers (8) are resiliently supported independently from each other in the pressing direction on an abutment (13) provided between the lateral retainers (12).

2. The apparatus according to claim 1, wherein the bearing receivers (8) comprise rolling bodies (9) engaging in the grooved pulleys (6).

3. The apparatus according to claim 1, wherein the grooved pulleys (6) are combined into individual pressure elements (15) between the pressure plates (17), which comprise a sliding surface (19) for belt deflection which is curved according to the grooved pulleys (6) and form the lateral guide stops (7), and wherein the retainers (12) arranged laterally on the pressure elements (15) displaceably engage in the pressing direction in recesses (18) of the pressure plates (17).

4. The apparatus according to claim 3, wherein the pressure plates (17) form sliding shoes (23) which are resilient in the pressing direction and are separated from the remaining plate body by resilient webs (24).

5. The apparatus according to claim 4, wherein the sliding shoes (23) of the pressure plates (17) are subdivided into sliding segments which are parallel to the plane of the plate and are independently resilient from each other.

6. The apparatus according to claim 1, wherein the bearing roller (11) for the endless belts (10) can be driven by a shaft (26).

* * * * *